United States Patent [19]

Baumann

[11] 4,085,774
[45] Apr. 25, 1978

[54] ANTICAVITATION AND LOW NOISE MEANS FOR ROTARY VALVES

[76] Inventor: Hans D. Baumann, 32 Pine St., Rye, N.H. 03870

[21] Appl. No.: 706,541

[22] Filed: Jul. 19, 1976

[51] Int. Cl.² ............................................. F16K 47/08
[52] U.S. Cl. ............................. 137/625.3; 137/625.32; 138/45
[58] Field of Search .................. 137/625.31, 625.32, 137/625.3; 251/315, 316, 127; 138/45 A

[56] References Cited

U.S. PATENT DOCUMENTS

| 659,514 | 10/1900 | Duffy | 137/625.31 X |
| 727,588 | 5/1903 | Clarke | 138/46 X |
| 1,852,164 | 5/1932 | Holzwarth | 138/46 X |
| 3,542,337 | 11/1970 | Scaramucci | 251/315 X |
| 3,786,837 | 1/1974 | Pipkins | 137/625.32 |

FOREIGN PATENT DOCUMENTS

| 854,833 | 1/1940 | France | 137/625.32 |
| 157,136 | 12/1956 | Sweden | 138/46 |

Primary Examiner—Arnold Rosenthal

[57] ABSTRACT

Anticavitation and low noise means attached to the downstream port of rotary valves, having spherical or semispherical plug means, consisting of a plate having one plane terminating surface and one opposite concave spherical indentation closely engaging the spherical plug surface and containing within its circumferential boundary line a multitude of individual flow passages, each of which has a reduced diameter discharge port within the terminating plane surface of the plate.

9 Claims, 3 Drawing Figures

ANTICAVITATION AND LOW NOISE MEANS FOR ROTARY VALVES

This invention relates to pressure reducing valves and especially rotary valves such as ball valves or semispherical ball valves. All these valves have very streamlined and unobstructed flow passages, particularly when approaching the wide open position, where the internal resistance (i.e. pressure loss) approaches that of a simple pipe.

Low, specific, hydraulic resistance, on the other hand, demands a high velocity in order to achieve the desired throttling action the valve is called to perform. Unfortunately, this high internal velocity can reduce the static pressure of liquids down to the vapor pressure of the particular fluid. The result is partial vaporization, which reverts back to the liquid phase upon deceleration downstream of the throttling plug. This process is called cavitation and is the single most destructive form of erosion of valve parts.

High velocity of gaseous media results in excessive aerodynamic noise.

A pressure loss factor $F_L$ is commonly used in the valve industry to define, how much of the kinetic energy within a valve is lost by the throttling process.

As defined:

$$P_1 - P_2 = F_L^2 (P_1 - P_c),$$

wherein $P_1$ is the absolute inlet pressure, $P_2$ the outlet pressure, and $P_c$ is the static pressure at the Vena Contracta i.e. at the point of highest throttling velocity. Vaporization at the Vena Contracta will occur whenever $$P_1 - P_2 \geq F_L^2 (P_1 - P_v),$$

wherein $P_v$ is the vapor pressure of the liquid.

A typical semispherical plug valve in the wide open position has a $F_L^2$ of 0.36. This means, the valve will cavitate with cold water ($P_v \approx 0$ psia), whenever the pressure drop ($P_1 - P_2$) exceeds 36% of the inlet pressure. Such a low limit severely restricts the applicability of such a valve type.

Furthermore, cavitation occurring within a single large valve port produces relatively large vapor bubbles, which generate much more noise and pipe vibrations than a large number of very small bubbles would.

My invention overcomes all these disadvantages. First, my invention allows the throttling flow area to be subdivided into a multitude of individual channels each to:

a. provide abrupt discharge means for high loss of kinetic energy, and
 b. to reduce noise by providing a large number of small jet streams rather than one large single opening.

The fluid Mechanic Laws teach, that pressure loss is proportional to the ratio of the square of throttling velocity to pipe discharge velocity. This can be expressed as $$k = (1 - A_1/A_2)^2 \text{ and } F_L^2 = f(k),$$

wherein $A_1$ = throttling area and $A_2$ = the pipe area.

$F_L^2$ will be higher, the smaller the throttling area becomes in relation to the pipe or discharge area of the valve.

While it is impractical to reach a $F_L^2$ factor of 1, that is, to avoid cavitation under all conditions, it is nevertheless quite possible to at least double this factor without too much decrease in flow capacity of the valve. However, even if cavitation occurs at high pressure drops, the damage causing implosion of the vapor bubbles will only occur outside my plate means and within a narrowly confined space within the open pipe area in contrast to the damage causing impact of a large angularly tilted cavitating jet from a conventional single valve orifice.

The noise level too will be greatly reduced with my invention, first by reducing the amount of vapor formed [function of $P_1 - F_L^2 (P_1 - P_v)$], and secondly by subdividing the noise sources.

Since the sound pressure level is a function of 20 log mass flow and therefore 20 log $A_1$, the application of, say, 100 holes instead of one single orifice will save 20 log ($A_1 \times 100^{-\frac{1}{2}}$) + 10 log (100) = 10 decibles.

Some state of the art rotary valves do employ a tuble bundle inserted into the pipe downstream of the valve to achieve subdivision of flow. However, their success is limited due to the fact that the total area of all tube openings is not significantly less than that of the pipe area, i.e. no meaningful increase of $F_L^2$ is achieved.

Secondly, cavitation will occur within the individual tube itself rather than when discharging into the pipe due to the fact, that individual jets, when entering each tube opening, will contract somewhat and thereby produce the highest throttling velocity and thereby vapor formation near the entrance portion of each tube, which will then recollaps, i.e. cavitate within the tube itself.

My invention overcomes this phenomena by providing a counter-bored entrance portion for each passage, thereby forcing each jet to contract only shortly before discharging into the pipe space.

Other and more detailed objects and advantages will appear hereinafter.

DETAILED DESCRIPTION OF THE INVENTION

Figure 1:
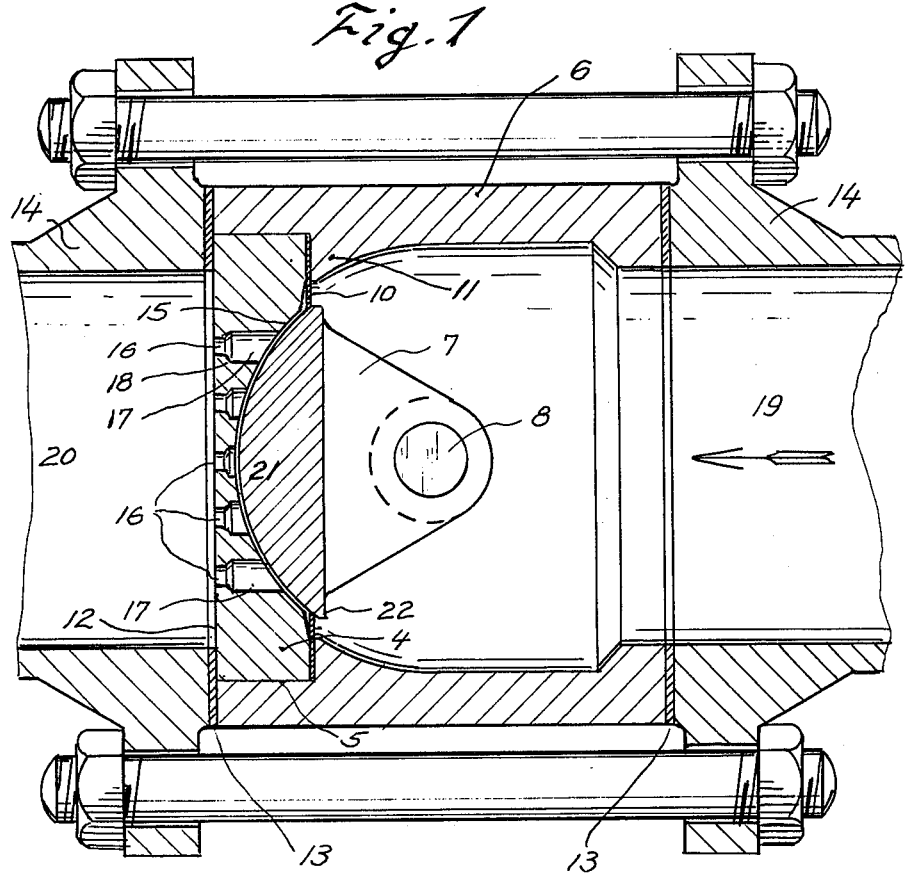
FIG. 1 is a longitudinal sectional view of a preferred embodiment of my invention attached to a rotary valve and forming part of a piping system.
Figure 2:
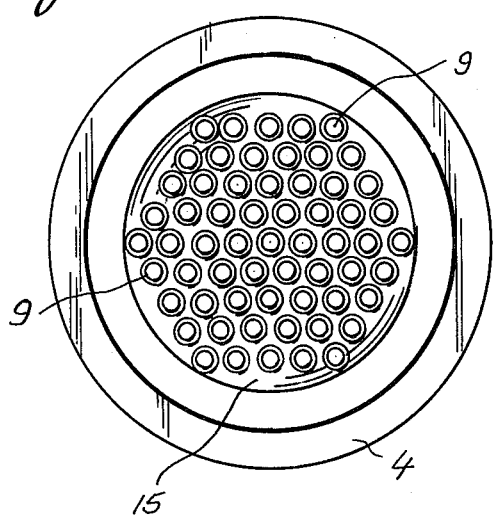
FIG. 2 is a plane surface view of my invention shown in FIG. 1, when viewed from the upstream side.

Referring to FIG. 1, my invention in its preferred embodiment comprises a perforated plate 4 contained within a counterbore 5 of a valve housing 6. The latter being part of a conventional rotary type throttling valve, shown here with a semispherical plug 7 in the closed position. Plug 7 is typically rotated through an arc of 90° by a valve shaft 8 and thereby gradually exposing a multitude of circular flow passages 9, disposed in plate 4. Plug 7 further engages a thin and flexible metal seat ring 10, which provides for tight closure of the valve and which is clamped between plate 4 and a shoulder 11 of housing 6. One terminating plane surface 12 of plate 4 locates flush with one face of housing 6 and together abuts one of two gaskets 13 to seal against loss of fluid from a piping system. Two flanges 14 form part of such a piping system.

A central area of plate 4 located opposite of face 12 has a concave, semispherical indenture 15, whose profile closely matches that of plug 7, providing but a small clearance between the two, to allow for machining tolerances.

Flow passages 9 generally located within the semispherical indenture 15 consist of individual circular bores 16, each having an enlarged counterbore 17 with a shoulder 18, the latter terminating near face 12 of plate 4. The diameter ratio between counterbore 17 and bore 16 should exceed 1.25 to obtain the best utilization of the total area of bores 16 for the conductance of fluid. The distance between shoulder 18 and face 12 is preferably less than 1 diameter of counterbore 17, to provide highest acceleration of the passing fluid from pipe 19 immediately before discharging into pipe 20. This avoids deceleration of fluid within the boundaries of bores 16 and prevents cavitation within plate 4.

FIG. 1 shows valve plug 7 in the "closed valve" position. Rotation of plug 7 will cause disengagement of the spherical head portion 21 of plug 7 from seat 10 and cause flow to commence. Further rotation will cause the leading edge 22 of plug 7 to uncover flow passages 9, which at about 90° travel will be completely uncovered.

Figure 3:
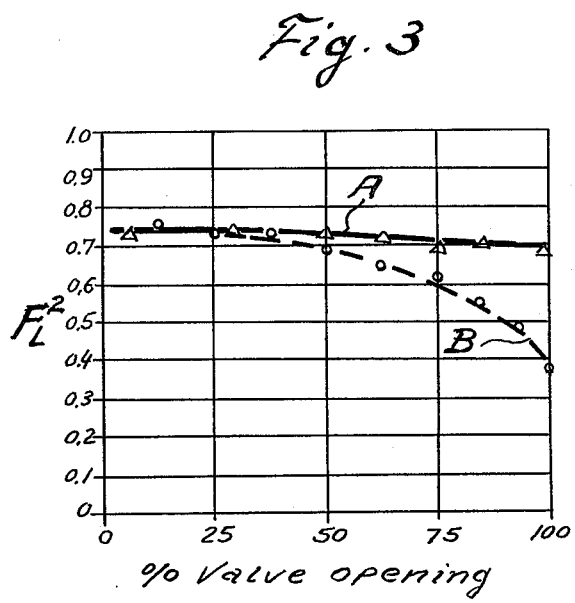
FIG. 3 is a graphical illustration of the $F_L^2$ factor as function of valve opening for a typical embodiment of my invention compared to that of a rotary plug valve.

The entrance velocity of fluid within counterbore 17 is quite low compared to that in passage 16, which then acts as the throttling orifice as intended. The resultant $F_L^2$ value is quite high and uniform compared to a standard valve, as demonstrated in FIG. 3, showing test results with my invention (curve labeled A) compared to similar data obtained with a single orifice valve (curve B).

While the invention has been described in one preferred embodiment, nothing should exclude the possibility to make numerous modifications such as using square or rectangular slots for passages 16 and counterbore 17, or, to use two or more plates 4 in series with a rotary valve, in order to even further increase $F_L^2$ without departing from the scope of the attached claims.

I claim:

1. In a rotary valve including a body having inlet and outlet flow passages therein and a valve closure rotatably mounted therein, said closure having an arcuate convex spherical surface head portion, and cavitation resistance discharge means in said valve comprising:
   a plate secured in said outlet flow passage, said plate having an inner concave spherical surface complementary and closely spaced to, the path of rotation of said convex surface head portion; and
   a plurality of anti-cavitation passageways through said plate parallel to the axis of said outlet flow passage, each of said anti-cavitation passageways having an enlarged entrance portion opening from said concave surface and terminating within said plate near the downstream surface thereof, and
   an exit portion of smaller cross-section communicating with said entrance portion and opening from the downstream side of said plate.

2. The rotary valve defined by claim 1 wherein:
   said entrance and exit portions of the anti-cavitation passageways are circular.

3. The rotary valve defined by claim 1 wherein:
   said exit and entrance portions of the anti-cavitation passageways are circular bores and counterbores, respectively.

4. The rotary valve defined by claim 1 wherein:
   said anti-cavitation passageways are relatively uniform spaced over said concave surface.

5. The rotary valve defined by claim 1 wherein:
   the ratio between the cross dimensions of the entrance and exit portions of the individual anti-cavitation passageways are at least 5 to 4.

6. The rotary valve defined by claim 1 wherein:
   the length of the exit portion of each individual anti-cavitation passageway is less than the cross dimension of the entrance portion thereof.

7. The rotary valve defined by claim 1 wherein:
   the lengths of the exit portion of the individual anti-cavitation passageways are substantially equal.

8. The rotary valve defined by claim 2 wherein:
   the length of the exit portion of each individual anti-cavitation passageway is less than the diameter of the entrance portion thereof.

9. The rotary valve defined by claim 3 wherein:
   the diametral ratio between each of said counterbore and bore is at least 5 to 4.

* * * * *